United States Patent
Chang

(10) Patent No.: US 6,411,926 B1
(45) Date of Patent: Jun. 25, 2002

(54) DISTRIBUTED VOICE RECOGNITION SYSTEM

(75) Inventor: Chienchung Chang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 09/246,413

(22) Filed: Feb. 8, 1999

(51) Int. Cl.$^7$ ............................................. G01L 19/24
(52) U.S. Cl. ...................... 704/221; 704/231; 704/243; 704/201; 379/324
(58) Field of Search ............................... 704/221, 201, 704/258, 220, 251, 256, 270.1, 231, 255, 243, 257, 254; 379/324, 413, 399, 88.04, 88.03; 700/83

(56) References Cited

U.S. PATENT DOCUMENTS

| | | | |
|---|---|---|---|
| 4,567,606 A | 1/1986 | Vensko et al. ................. 381/43 |
| 4,731,811 A | 3/1988 | Dubus ........................... 379/58 |
| 4,903,301 A * | 2/1990 | Kondo et al. ................. 704/229 |
| 4,961,229 A | 10/1990 | Takahashi ..................... 381/42 |
| 4,991,217 A | 2/1991 | Garrett et al. ................. 381/43 |
| 5,012,518 A | 4/1991 | Liu et al. ....................... 381/42 |
| 5,040,212 A | 8/1991 | Bethards ....................... 381/41 |
| 5,054,082 A | 10/1991 | Smith et al. .................. 381/42 |
| 5,109,509 A | 4/1992 | Katayama et al. ........... 395/600 |
| 5,146,538 A | 9/1992 | Sobti et al. ..................... 395/2 |
| 5,231,670 A | 7/1993 | Goldhor et al. ............... 381/43 |
| 5,280,585 A | 1/1994 | Kochis et al. ............... 395/275 |
| 5,321,840 A | 6/1994 | Ahlin et al. ................. 395/700 |
| 5,325,524 A | 6/1994 | Black et al. ................. 395/600 |
| 5,371,901 A | 12/1994 | Reed et al. ................... 455/69 |
| 5,414,796 A | 5/1995 | Jacobs et al. ................ 395/2.3 |
| 5,651,096 A * | 7/1997 | Pallakoff et al. ............ 704/275 |
| 5,774,836 A * | 6/1998 | Bartkowiak et al. ........ 704/207 |
| 5,774,841 A * | 6/1998 | Salazar et al. .............. 704/225 |

(List continued on next page.)

FOREIGN PATENT DOCUMENTS

| | | | |
|---|---|---|---|
| DE | 19533541 | 3/1997 | |
| EP | 0108354 | 5/1984 | ........... G06F/15/16 |
| EP | 0534410 | 3/1993 | ............. G10L/5/00 |
| EP | 0855643 | 7/1998 | |
| EP | 0 855 643 A1 * | 7/1998 | ............. G06F/9/30 |
| GB | 2292443 | 2/1996 | |
| WO | 9517746 | 6/1995 | |

OTHER PUBLICATIONS

1993 Fundamentals of Speech Recognition, Rabiner et al., pp. 69–241.
1978 Digital Processing of Speech Signals, "Linear Predictive Coding of Speech", Rabiner et al., pp. 396–453, 1978.
1989 IEEE, "Efficienct Encoding of Speech LSP Parameters Using the Discrete Cosine Transformation", Farvardin et al., pp. 168–171.
Kim S–N et al.: "A VLSI Chip for Isolated Speech Recognition System," IEEE Transactions on Consumer Electronics, US, IEEE Inc. New York, vol. 42, No. 3, Aug. 1, 1996.

*Primary Examiner*—Richemond Dorvil
*Assistant Examiner*—Vijay Chawan
(74) *Attorney, Agent, or Firm*—Philip Wadsworth; Kent D. Baker; Thomas R. Rouse

(57) ABSTRACT

A distributed voice recognition system includes a digital signal processor (DSP), a nonvolatile storage medium, and a microprocessor. The DSP is configured to extract parameters from digitized input speech samples and provide the extracted parameters to the microprocessor. The nonvolatile storage medium contains a database of speech templates. The microprocessor is configured to read the contents of the nonvolatile storage medium, compare the parameters with the contents, and select a speech template based upon the comparison. The nonvolatile storage medium may be a flash memory. The DSP may be a vocoder. If the DSP is a vocoder, the parameters may be diagnostic data generated by the vocoder. The distributed voice recognition system may reside on an application specific integrated circuit (ASIC).

14 Claims, 3 Drawing Sheets

U.S. PATENT DOCUMENTS

| | | | |
|---|---|---|---|
| 5,784,532 A | * 7/1998 | McDonough et al. | 704/224 |
| 5,794,196 A | 8/1998 | Yegnanarayanan et al. | |
| 5,826,199 A | 10/1998 | Maeda | |
| 5,832,430 A | * 11/1998 | Lleida et al. | 704/256 |
| 5,850,627 A | 12/1998 | Gould et al. | |
| 5,956,683 A | * 9/1999 | Jacobs et al. | 704/275 |
| 6,003,004 A | * 12/1999 | Hershdovits et al. | 704/253 |
| 6,061,653 A | * 5/2000 | Fisher et al. | 704/256 |

* cited by examiner

DISTRIBUTED VOICE RECOGNITION SYSTEM

BACKGROUND OF THE INVENTION

I. Field of the Invention

The present invention pertains generally to the field of communications, and more specifically to voice recognition systems.

II. Background

Voice recognition (VR) represents one of the most important techniques to endow a machine with simulated intelligence to recognize user or user voiced commands and to facilitate human interface with the machine. VR also represents a key technique for human speech understanding. Systems that employ techniques to recover a linguistic message from an acoustic speech signal are called voice recognizers. A voice recognizer typically comprises an acoustic processor, which extracts a sequence of information-bearing features, or vectors, necessary to achieve VR of the incoming raw speech, and a word decoder, which decodes the sequence of features, or vectors, to yield a meaningful and desired output format such as a sequence of linguistic words corresponding to the input utterance. To increase the performance of a given system, training is required to equip the system with valid parameters. In other words, the system needs to learn before it can function optimally.

The acoustic processor represents a front-end speech analysis subsystem in a voice recognizer. In response to an input speech signal, the acoustic processor provides an appropriate representation to characterize the time varying speech signal. The acoustic processor should discard irrelevant information such as background noise, channel distortion, speaker characteristics, and manner of speaking. Efficient acoustic processing furnishes voice recognizers with enhanced acoustic discrimination power. To this end, a useful characteristic to be analyzed is the short time spectral envelope. Two commonly used spectral analysis techniques for characterizing the short time spectral envelope are linear predictive coding (LPC) and filter-bank-based spectral modeling. Exemplary LPC techniques are described in U.S. Pat. No. 5,414,796, which is assigned to the assignee of the present invention and fully incorporated herein by reference, and L. B. Rabiner & R. W. Schafer, *Digital Processing of Speech Signals* 396–453 (1978), which is also fully incorporated herein by reference.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a phone without VR, the driver must remove one hand from the steering wheel and look at the phone keypad while pushing the buttons to dial the call. These acts increase the likelihood of a car accident. A speech-enabled phone (i.e., a phone designed for speech recognition) would allow the driver to place telephone calls while continuously watching the road. And a hands-free car-kit system would additionally permit the driver to maintain both hands on the steering wheel during call initiation.

Speech recognition devices are classified as either speaker-dependent or speaker-independent devices. Speaker-independent devices are capable of accepting voice commands from any user. Speaker-dependent devices, which are more common, are trained to recognize commands from particular users. A speaker-dependent VR device typically operates in two phases, a training phase and a recognition phase. In the training phase, the VR system prompts the user to speak each of the words in the system's vocabulary once or twice so the system can learn the characteristics of the user's speech for these particular words or phrases. Alternatively, for a phonetic VR device, training is accomplished by reading one or more brief articles specifically scripted to cover all of the phonemes in the language. An exemplary vocabulary for a hands-free car kit might include the digits on the keypad; the keywords "call," "send," "dial," "cancel," "clear," "add," "delete," "history," "program," "yes," and "no"; and the names of a predefined number of commonly called coworkers, friends, or family members. Once training is complete, the user can initiate calls in the recognition phase by speaking the trained keywords. For example, if the name "John" were one of the trained names, the user could initiate a call to John by saying the phrase "Call John." The VR system would recognize the words "Call" and "John," and would dial the number that the user had previously entered as John's telephone number.

Conventional VR devices typically use a digital signal processor (DSP) or a microprocessor to analyze the incoming speech samples, extract the relevant parameters, decode the parameters, and compare the decoded parameters with a stored set of words, or VR templates, which comprises the vocabulary of the VR device. The vocabulary is stored in a nonvolatile memory such as, e.g., a flash memory. In a conventional VR system with both a DSP and a microprocessor, such as, e.g., a digital cellular telephone, the nonvolatile memory generally accessible by the microprocessor, but not by the DSP. In such a system, if the VR is performed entirely the microprocessor, the microprocessor is usually short of computation power to deliver the recognition results with a reasonable latency. On the other hand, if the VR is performed entirely in the DSP, the microprocessor needs to read the flash memory and pass the contents of the read to the DSP, as the DSP has a relatively small size of on-chip memory not sufficient to hold the large VR templates. This is a lengthy process because the typical low bandwidth of the interface between the DSP and the microprocessor limits the amount of data that can be transferred between the two devices in a given amount of time. Thus, there is a need for a VR device that efficiently combines the computational power of a DSP with the memory capacity of a microprocessor.

SUMMARY OF THE INVENTION

The present invention is directed to a VR device that efficiently combines the computational power of a DSP with the memory capacity of a microprocessor. Accordingly, in one aspect of the invention, a distributed voice recognition system advantageously includes a digital signal processor configured to receive digitized speech samples and extract therefrom a plurality of parameters; a storage medium containing a plurality of speech templates; and a processor coupled to the storage medium and to the digital signal processor, the processor being configured to receive the plurality of parameters from the digital signal processor and compare the plurality of parameters with the plurality of speech templates.

In another aspect of the invention, a method of distributing voice recognition processing advantageously includes the steps of in a digital signal processor, extracting a plurality of parameters from a plurality of digitized speech samples; providing the plurality of parameters to a microprocessor; and in the microprocessor, comparing the plurality of parameters to a plurality of speech templates.

In another aspect of the invention, a distributed voice recognition system advantageously includes means for extracting a plurality of parameters from a plurality of digitized speech samples; means for permanently storing a plurality of speech templates; and means for receiving the plurality of parameters from the means for extracting and comparing the plurality of parameters with the plurality of speech templates.

DETAILED DESCRIPTION OF THE PREFERRED EMBODIMENTS

Figure 1:
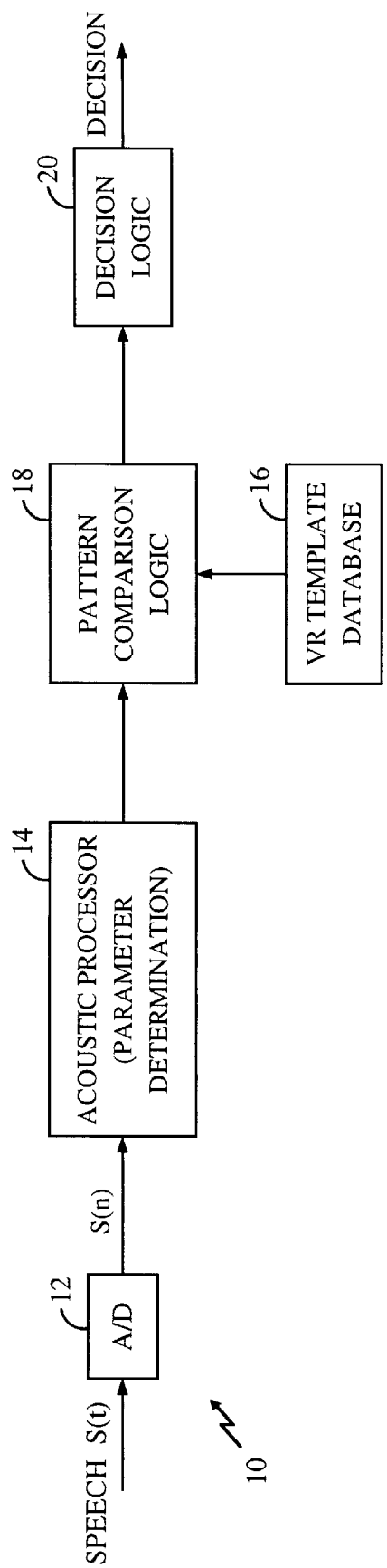
FIG. 1 is a block diagram of a conventional voice recognition system.

As illustrated in FIG. 1, a conventional voice recognition system 10 includes an analog-to-digital converter (A/D) 12, an acoustic processor 14, a VR template database 16, pattern comparison logic 18, and decision logic 20. The VR system 10 may reside in, e.g., a wireless telephone or a hands-free car kit.

When the VR system 10 is in speech recognition phase, a person (not shown) speaks a word or phrase, generating a speech signal. The speech signal is converted to an electrical speech signal s(t) with a conventional transducer (also not shown). The speech signal s(t) is provided to the A/D 12, which converts the speech signal s(t) to digitized speech samples s(n) in accordance with a known sampling method such as, e.g., pulse coded modulation (PCM).

The speech samples s(n) are provided to the acoustic processor 14 for parameter determination. The acoustic processor 14 produces a set of parameters that models the characteristics of the input speech signal s(t). The parameters may be determined in accordance with any of a number of known speech parameter determination techniques including, e.g., speech coder encoding and using fast fourier transform (FFT)-based cepstrum coefficients, as described in the aforementioned U.S. Pat. No. 5,414,796. The acoustic processor 14 may be implemented as a digital signal processor. The DSP may include a speech coder. Alternatively, the acoustic processor 14 may be implemented as a speech coder.

Parameter determination is also performed during training of the VR system 10, wherein a set of templates for all of the vocabulary words of the VR system 10 is routed to the VR template database 16 for permanent storage therein. The VR template database 16 is advantageously implemented as any conventional form of nonvolatile storage medium, such as, e.g., flash memory. This allows the templates to remain in the VR template database 16 when the power to the VR system 10 is turned off.

The set of parameters is provided to the pattern comparison logic 18. The pattern comparison logic 18 advantageously detects the starting and ending points of an utterance, computes dynamic acoustic features (such as, e.g., time derivatives, second time derivatives, etc.), compresses the acoustic features by selecting relevant frames, and quantizes the static and dynamic acoustic features. Various known methods of endpoint detection, dynamic acoustic feature derivation, pattern compression, and pattern quantization are described in, e.g., Lawrence Rabiner & Biing-Hwang Juang, *Fundamentals of Speech Recognition* (1993), which is fully incorporated herein by reference. The pattern comparison logic 18 compares the resultant set of parameters to all of the templates stored in the VR template database 16. The comparison results, or distances, between the set of parameters and all of the templates stored in the VR template database 16 are provided to the decision logic 20. The decision logic 20 selects from the VR template database 16 the template that most closely matches the set of parameters. In the alternative, the decision logic 20 may use a conventional "N-best" selection algorithm, which chooses the N closest matches within a predefined matching threshold. The person is then queried as to which choice was intended. The output of the decision logic 20 is the decision as to which word in the vocabulary was spoken.

The pattern comparison logic 18 and the decision logic 20 may advantageously be implemented as a microprocessor. The VR system 10 may be, e.g., an application specific integrated circuit (ASIC). The recognition accuracy of the VR system 10 is a measure of how well the VR system 10 correctly recognizes spoken words or phrases in the vocabulary. For example, a recognition accuracy of 95% indicates that the VR system 10 correctly recognizes words in the vocabulary ninety-five times out of 100.

Figure 2:
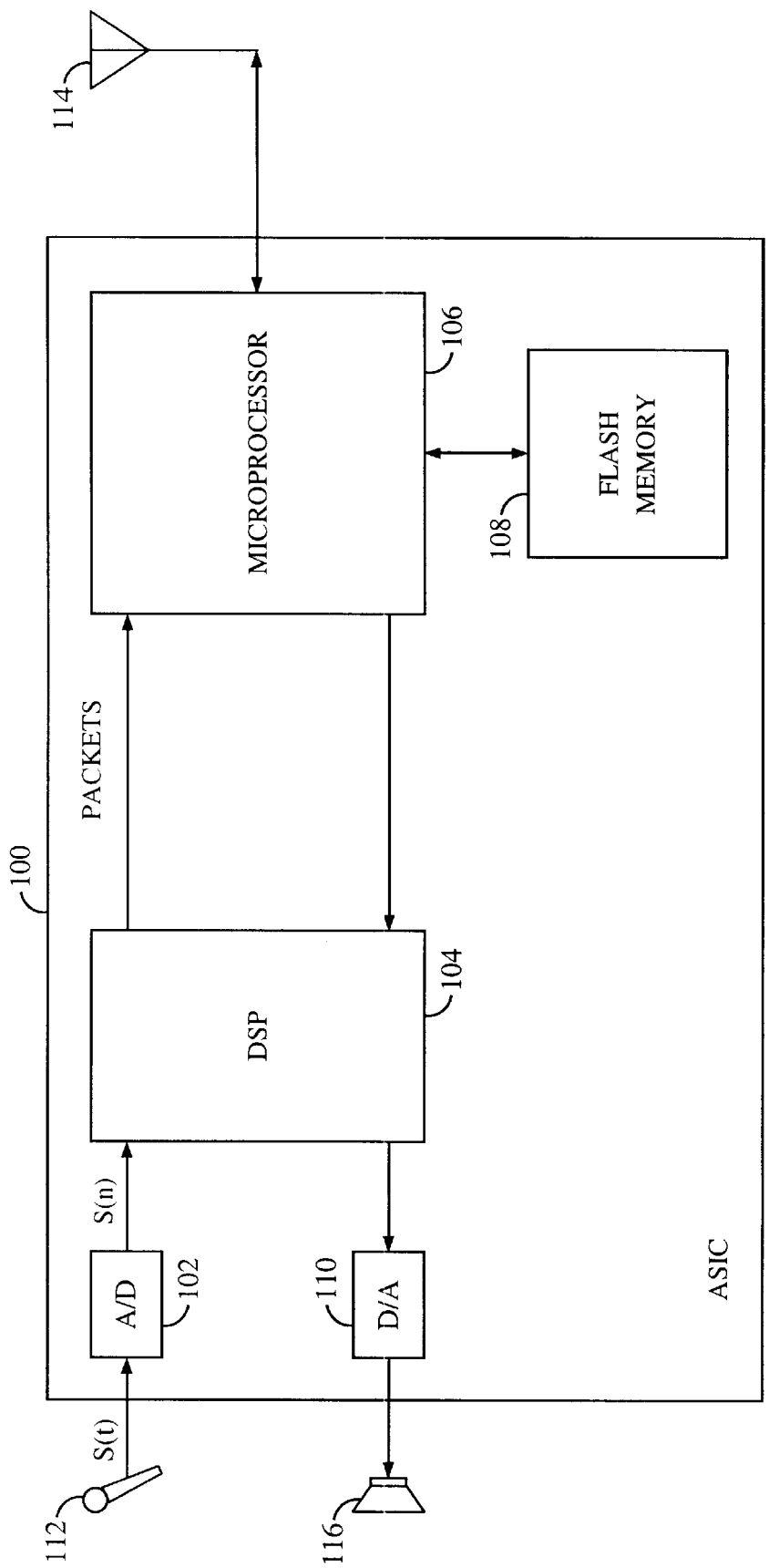
FIG. 2 is a block diagram of a distributed voice recognition system.
Figure 3:
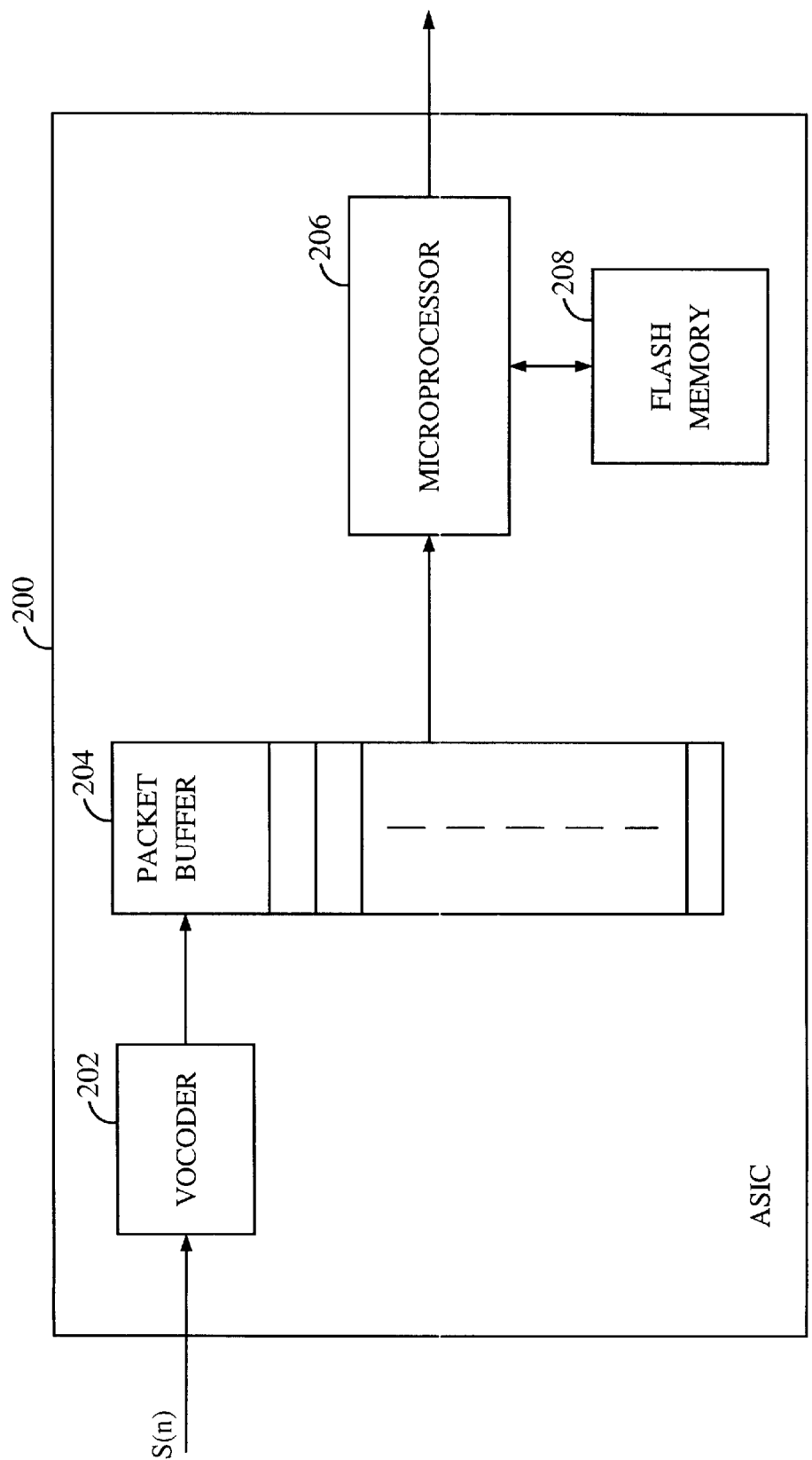
FIG. 3 is a block diagram of a distributed voice recognition system that uses a vocoder for front-end processing.

In one embodiment, illustrated in FIG. 2, a distributed VR system resides in an ASIC 100. The ASIC 100 could reside in, e.g., a wireless telephone. The ASIC 100 includes an A/D 102, a DSP 104, a processor 106, a nonvolatile storage medium 108, and a digital-to-analog converter (D/A) 110. The processor 106 is advantageously a microprocessor 106, but in the alternative the processor 106 may be any conventional processor, controller, or state machine. The nonvolatile storage medium 108 is advantageously a flash memory 108, but in the alternative the nonvolatile storage medium 108 may be any conventional form of nonvolatile, writable memory. The DSP 104 includes a speech coder (not shown) and a speech decoder (also not shown). The DSP 104 may perform several functions, including, e.g., vocoding, VR front-end processing (i.e., speech analysis), background noise suppression, and acoustic echo cancellation. In the alternative the DSP 104 may be a conventional vocoder such as an 8 kilobit-per-second (kbps) code excited linear predictive (CELP) coder, a 13 kbps CELP coder (described in the aforementioned U.S. Pat. No. 5,414,796), or a code division multiple access (CDMA) enhanced variable rate coding (EVRC) coder.

A microphone 112 is coupled to the ASIC 100 as an input to the A/D 102. A speaker (not shown) speaks into the microphone 112, which provides an analog speech signal s(t) to the A/D 102. The A/D 102 converts the analog speech signal s(t) to digital samples s(n) in accordance with a known method such as, e.g., PCM. The A/D 102 is coupled to the DSP 104. The digitized speech samples s(n) are provided to the DSP 104 for front-end processing.

In the DSP 104, Fourier Transforms are performed on the digitized speech samples s(n), converting the time-domain samples s(n) to frequency-domain values. The frequency domain is segmented into several adjacent frequency bandwidths by passing the signal through a plurality of bandpass filters (not shown). The bandpass filters may advantageously be finite impulse response (FIR) filters. The filter taps are set to pass a wider frequency bandwidth with each successive filter, with the change in width between successive filters increasing logarithmically. The range of frequencies passed by all of the filters together encompasses the human voice range. At the lower end, the bandwidths passed are relatively narrow, while at the higher end the bandwidths passed are relatively wide. This helps the human ear perceive sounds more accurately because the human ear discriminates better at lower frequencies. The logarithmic frequency scale may be the Bark scale, or, in the alternative, the scale may be the Mel scale. Such scales are well known and are described in, e.g., the aforementioned Lawrence Rabiner & Biing-Huang Juang, *Fundamentals of Speech Recognition* 78–79 (1993).

In one embodiment thirteen bandpass filters are employed. The following equations described the bank of filters:

$b_1 = C,$ $b_i = b_{i-1},$ for $2 \leq i \leq 13,$ and $$f_1 = f_1 + \sum_{j=i-1}^{j=1} b_j + (b_i - b_1)/2$$

where C and $f_1$ are, respectively, the arbitrarily set bandwidth and center frequency of the first filter, and a is the logarithmic growth factor.

For each frame the DSP 104 extracts a vector of band power values in accordance with conventional methods of feature extraction, which are described in, e.g., the aforementioned U.S. Pat. No. 5,414,796, Rabiner & Schafer, *supra*, and Rabiner & Juang, *supra*, at 69–140. In one embodiment a vector of thirteen band power values is extracted every frame, with frames being twenty milliseconds long and overlapping by fifty percent. The band power values are packetized and provided as packets to the microprocessor 106.

The microprocessor 106 accesses the flash memory 108 to read the stored template vocabulary contents of the flash memory 108. The microprocessor 106 detects the starting and ending points of an utterance, if endpoints are required in the VR decoder (not shown), based upon the received data packets. The microprocessor 106 then computes dynamic acoustic features (such as, e.g., time derivatives, second time derivatives, etc.), compresses the acoustic features by selecting relevant frames, and quantizes the static and dynamic acoustic features. Various known methods of endpoint detection, dynamic acoustic feature derivation, pattern compression, and pattern quantization are described in, e.g., the aforementioned Lawrence Rabiner & Biing-Hwang Juang, *Fundamentals of Speech Recognition* (1993).

The microprocessor 106 compares the utterance with the contents of the flash memory 108. The microprocessor 106 selects the stored word that most closely resembles the packet. Various pattern recognition techniques are described in Rabiner & Juang, *supra*, at 141–241. The microprocessor 106 then performs a command that is associated with the stored word, such as, e.g., initiating a telephone call to a particular person by communicating with a base station (not shown) through an antenna 114 coupled to the microprocessor 106.

When a conversation begins, traffic channel speech packets are encoded by the DSP 104, routed to the microprocessor 106, and modulated for transmission over the air by modulation circuitry (not shown). The packets may also be encoded prior to modulation with encoding logic (not shown) in the microprocessor 106. The packets are then transmitted over the air through the antenna 114. Received speech packets from the other side of the conversation are routed from the antenna 114 to demodulation circuitry (not shown). The demodulated packets may be decoded with decoding logic (not shown) in the microprocessor 106. The packets are then routed from the microprocessor 106 to the DSP 104, which vector unquantizes the packets. The packets are then provided to the D/A 110 for conversion to an analog speech signal. The analog speech signal is provided to a loudspeaker 116, which produces words heard by the speaker.

In one embodiment an ASIC 200 includes a vocoder 202 to perform front end processing for VR. The vocoder 202 is coupled to a packet buffer 204. The packet buffer 204 is coupled to a processor 206. The processor 206 is coupled to a nonvolatile storage medium 208. The ASIC 200 may reside in, e.g., a wireless telephone handset. The vocoder 202 is a variable rate 13 kbps CELP vocoder, as described in the aforementioned U.S. Pat. No. 5,414,796, but could equally well be an 8 kbps CELP vocoder or a CDMA EVRC vocoder. The processor 206 is advantageously a microprocessor, but could instead be any conventional form of processor, controller, or state machine. The nonvolatile storage medium 208 is advantageously implemented with flash memory, but in the alternative may be implemented with any conventional form of writable, nonvolatile memory. The packet buffer 204 is a conventional buffer element.

Digitized speech samples s(n) are provided to the vocoder 202. The vocoder 202 encodes the speech samples s(n) with a known vocoding technique that is described in the aforementioned U.S. Pat. No. 5,414,796. In the particular embodiment described, the vocoder 202 generates 128 bytes per frame, with each frame being twenty milliseconds in length. Each frame, 128 bytes are provided to the packet buffer 204. The microprocessor 206 reads 128 bytes (one packet) from the packet buffer 204 every frame. The microprocessor 206 then detects the starting and ending points of an utterance, if endpoints are required in the VR decoder (not shown), based upon the received data packets. The microprocessor 206 then computes dynamic acoustic features (such as, e.g., time derivatives, second time derivatives, etc.), compresses the acoustic features by selecting relevant frames, and quantizes the static and dynamic acoustic features. Various known methods of endpoint detection, dynamic acoustic feature derivation, pattern compression, and pattern quantization are described in, e.g., the aforementioned Lawrence Rabiner & Biing-Hwang Juang, *Fundamentals of Speech Recognition* (1993). The microprocessor 206 then accesses the flash memory 208, compares the memory contents with each packet read from the packet buffer 204, and makes a word decision in accordance with known pattern recognition techniques described in Rabiner & Juang, *supra*, at 141–241.

In the particular embodiment described, if the vocoder 202 is encoding at full rate, thirty-five bytes per frame are generated, with the remainder of the 128 bytes being available for vocoder diagnostic data. If the vocoder 202 is encoding at half rate, seventeen bytes per frame are generated, with the remainder of the 128 bytes being available for vocoder diagnostic data. If the vocoder 202 is encoding at quarter rate, seven bytes per frame are generated, with the remainder of the 128 bytes being available for vocoder diagnostic data. If the vocoder 202 is encoding at eighth rate, three bytes per frame are generated, with the remainder of the 128 bytes being available for vocoder diagnostic data. Advantageously, the vocoder 202 encodes at half rate during speech recognition. Accordingly, 111 bytes are available for vocoder diagnostic data.

In the specific embodiment described, fifty-one bytes are required for diagnostic data regardless of the coding rate of the vocoder 202. Forty additional bytes are needed for vocoder diagnostic data if the vocoder 202 is coding at full rate. Only sixteen additional bytes are needed for vocoder diagnostic data if the coding rate is half rate. Only five additional bytes are needed for vocoder diagnostic data if the coding rate is quarter rate. And only one additional byte is needed for vocoder diagnostic data if the coding rate is eighth rate.

While the vocoder packets comprise quantized parameters (e.g., at half rate the seventeen vocoder bytes are quantized), the vocoder diagnostic data bytes contain unquantized parameters (e.g., at half rate up to 128−17=111 bytes of vocoder diagnostic data are not quantized). Moreover, although the vocoder diagnostic data does not include all of the vocoder data, the vocoder diagnostic data does include all of the vocoder data that pertains to VR. Accordingly, the vocoder diagnostic data may be used for VR purposes. This provides a significant advantage, as described below.

Obtaining relevant VR parameters from the vocoder packets requires that the packets first be unquantized. For example, in the vocoder 202, linear predictive coding (LPC) coefficients are converted to line spectral pair (LSP) frequencies. Ten LSP frequencies per frame are vector quantized and packed into regular vocoder packets. In the microprocessor 206, the unquantized LSP frequencies are obtained by unpacking the received vocoder packets on a frame basis and unquantizing them. The unquantized LSP frequencies are then converted to LPC coefficients. The LPC coefficients are then converted to cepstral coefficients, which are the coefficients of the Fourier Transform representation of the log magnitude spectrum. The cepstral coefficents are obtained by taking the inverse Fourier Transform of the logarithm of the Fourier Transform coefficients of the digitized speech samples s(n). Techniques for converting LSP frequencies to LPC coefficients to cepstral coefficients, and techniques for converting LPC coefficients to LSP frequencies to vocoder packets, are described in detail in the aforementioned U.S. Pat. No. 5,414,796.

To vector unquantize, or "uncompress," the data from the vocoder packets in the manner descibed above would be computationally expensive, requiring a large amount of processing capability. In addition, a large LSP vector quantization (VQ) codebook would be required, which the microprocessor 206 would have to store permanently in the flash memory 208. In the embodiment described, the requisite computational power and memory capacity are circumvented because instead of de-quantizing the vocoder packets for VR, the vocoder diagnostic data is used for VR.

Thus, a novel and improved distributed voice recognition system has been described. Those of skill in the art would understand that the various illustrative logical blocks and algorithm steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A distributed voice recognition system, comprising:
   a digital signal processor configured to receive digitized speech samples and extract therefrom a plurality of parameters, the digital signal processor including a vocoder configured to generate diagnostic data and vocoder packets;
   a storage medium containing a plurality of speech templates; and
   a processor coupled to the storage medium and to the digital signal processor, the processor being configured to receive the plurality of parameters and the vocoder packets from the digital signal processor and compare the plurality of parameters with the speech templates.

2. The system of claim 1, wherein the processor is further configured to record the vocoder packets and select one of the plurality of speech templates based upon comparing the plurality of parameters to the plurality of speech templates.

3. The system of claim 1, wherein the digital signal processor, the storage medium, and the processor reside on an application specific integrated circuit (ASIC).

4. The system of claim 1, wherein the plurality of parameters comprises at least a part of the diagnostic data generated by the vocoder.

5. The system of claim 4, wherein the vocoder, the storage medium, and the processor reside on an application specific integrated circuit (ASIC).

6. A method of distributing voice recognition processing, comprising the steps of:
   in a digital signal processor, extracting a plurality of parameters from a plurality of digitized speech samples with a vocoder configured to generate diagnostic data and vocoder packets;
   providing the plurality of parameters and the vocoder packets to a microprocessor; and
   in the microprocessor, comparing the plurality of parameters to a plurality of speech templates.

7. The method of claim 6, further comprising the steps of recording the vocoder packets in the microprocessor and selecting, in the microprocessor, one of the speech templates based upon a result of the comparing step.

8. The method of claim 6, wherein the plurality of parameters comprises at least a part of the diagnostic data generated by the vocoder.

9. A distributed voice recognition system, comprising:
   means for extracting a plurality of parameters from a plurality of digitized speech samples, the means for extracting comprising means for generating vocoder packets and diagnostic data;
   means for storing a plurality of speech templates; and
   means for receiving the plurality of parameters and the vocoder packets from the means for extracting and comparing the plurality of parameters with the plurality of speech templates.

10. The system of claim 9, wherein the means for receiving and comparing includes means for recording the vocoder packets and selecting one of the plurality of speech templates based upon comparing the plurality of parameters to the plurality of speech templates.

11. The system of claim 9, wherein the means for extracting, the means for storing, and the means for receiving and comparing reside on an application specific integrated circuit (ASIC).

12. The system of claim 9, wherein the plurality of parameters comprises at least a part of the diagnostic data generated by the means for generating vocoder packets diagnostic data.

13. The system of claim 9, wherein the means for storing comprises a flash memory.

14. The system of claim 9, wherein the vocoder, the means for storing, and the means for receiving and comparing reside on an application specific integrated circuit (ASIC).

* * * * *